United States Patent
Sielagoski et al.

(10) Patent No.: US 6,259,985 B1
(45) Date of Patent: Jul. 10, 2001

(54) METHOD AND SYSTEM FOR INDICATING VEHICLE BRAKING IN AN ADAPTIVE SPEED CONTROL SYSTEM

(75) Inventors: Gerald L. Sielagoski, St. Clair Shores; Mark Peter Friedrich, Clinton Township; Sam G. Rahaim, Ann Arbor, all of MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/470,556

(22) Filed: Dec. 22, 1999

(51) Int. Cl.$^7$ .................................................. B60K 31/00
(52) U.S. Cl. .............................................. 701/96; 180/171
(58) Field of Search .................................. 701/70, 78, 79, 701/96; 340/453, 438, 815.45, 461, 441, 463, 464, 467, 468; 345/39; 362/555

(56) References Cited

U.S. PATENT DOCUMENTS

| | | | |
|---|---|---|---|
| 4,320,384 | * 3/1982 | Carlson | 340/71 |
| 5,410,294 | * 4/1995 | Gold | 340/464 |
| 5,454,442 | * 10/1995 | Labuhn et al. | 180/169 |
| 5,486,808 | * 1/1996 | Nejdl | 340/464 |
| 5,663,706 | * 9/1997 | Francis | 340/464 |
| 5,781,703 | * 7/1998 | Gilling | 340/441 |
| 5,835,008 | * 11/1998 | Colemere, Jr. | 340/439 |
| 5,949,346 | * 9/1999 | Suzuki et al. | 340/815.45 |

* cited by examiner

Primary Examiner—Tan Nguyen
Assistant Examiner—Dalena Tran
(74) Attorney, Agent, or Firm—Mark L. Mollon

(57) ABSTRACT

In an adaptive speed control system for a vehicle, a method and system for indicating a vehicle braking event to an operator of the vehicle. The method includes determining the occurrence of a vehicle braking event commanded by the adaptive speed control system, and activating a vehicle braking indicator in response to the occurrence of the vehicle baking event, where the vehicle braking indicator is perceptible by the vehicle operator. The system includes a vehicle braking indicator perceptible by the vehicle operator, and a controller capable of determining the occurrence of a vehicle braking event commanded by the adaptive speed control system and generating a vehicle braking event signal in response to the occurrence of the vehicle braking event, where the vehicle braking event signal is operative to activate the vehicle braking indicator.

16 Claims, 1 Drawing Sheet

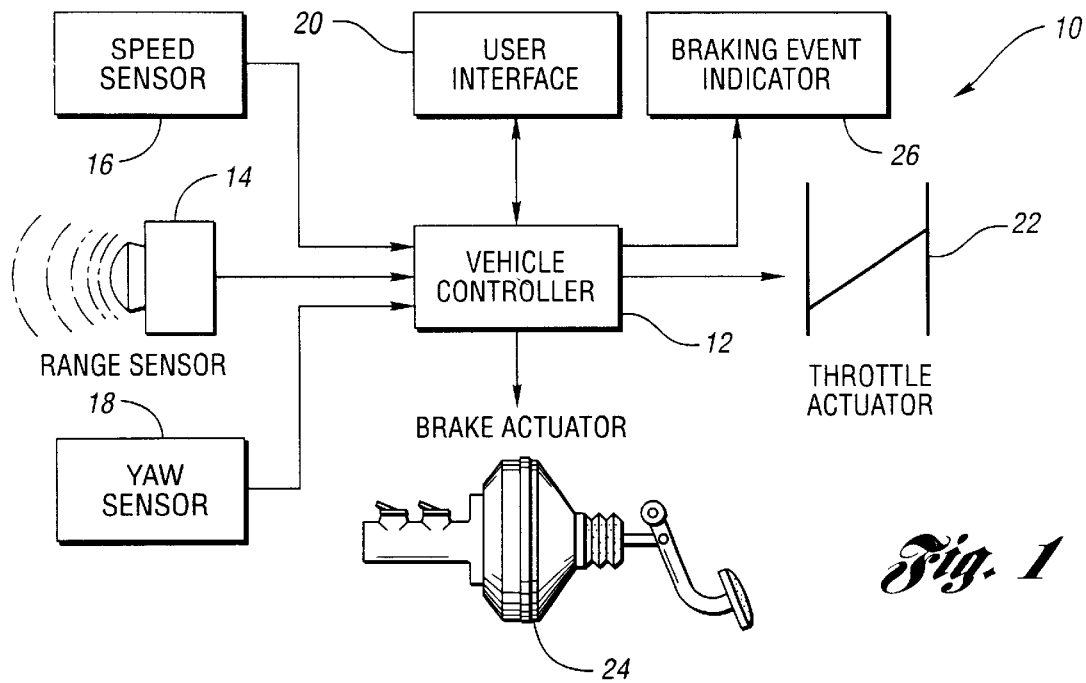
*Fig. 1*
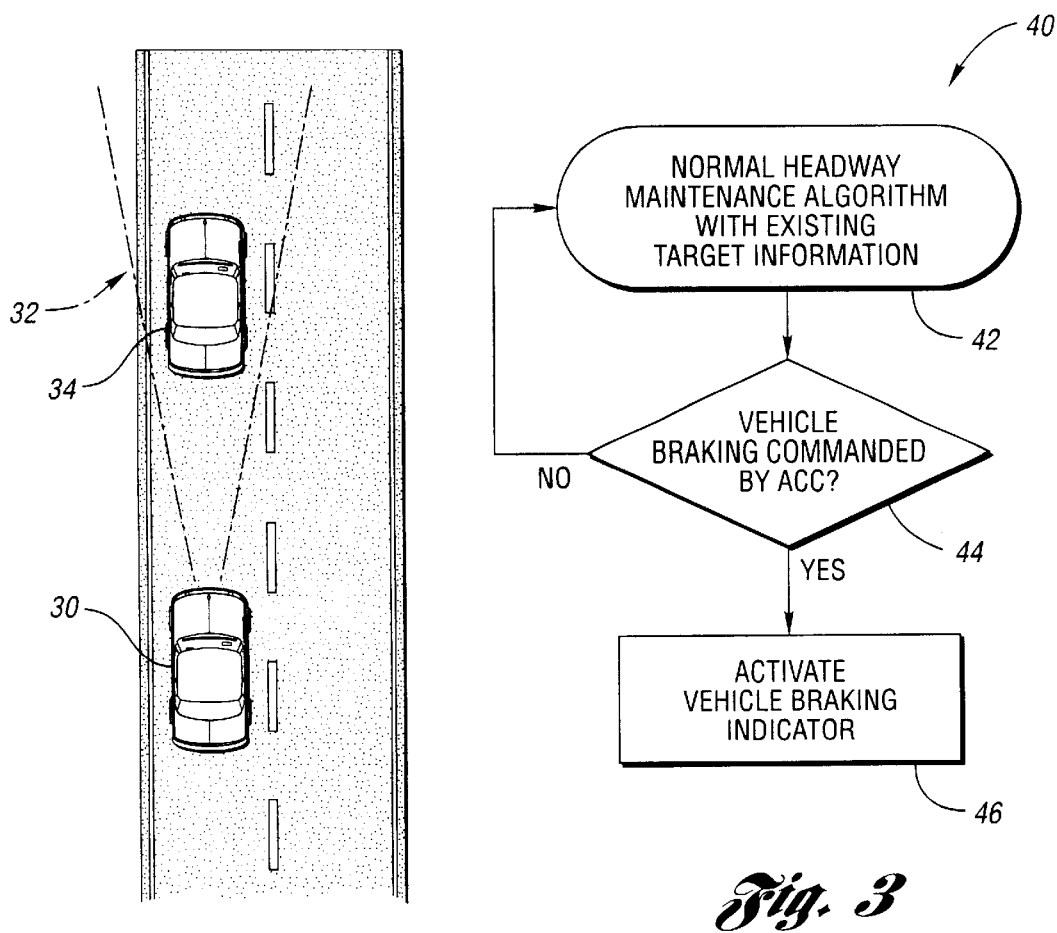
*Fig. 2*
*Fig. 3*

METHOD AND SYSTEM FOR INDICATING VEHICLE BRAKING IN AN ADAPTIVE SPEED CONTROL SYSTEM

TECHNICAL FIELD

This invention relates to a method and system for indicating to an operator of a vehicle a vehicle braking event commanded by an adaptive speed control system.

BACKGROUND ART

Adaptive Cruise (i.e., speed) Control (ACC) systems operate much like conventional Cruise Control systems, with the added capability of being able to sense in-path vehicles and to slow the ACC equipped vehicle in response. An ACC equipped vehicle thereby allows its operator to automatically control the vehicle speed, as with conventional Cruise Control, without the necessity of having to deactivate and reactivate control whenever slower traffic is encountered.

As is well known in the art, existing ACC methods and systems use a forward looking range sensor such as radar to sense an in-path vehicle (which may also be referred to as a sensed target or primary target). Based on the radar sensor information, such ACC methods and systems then determine the range and relative velocity (or range rate) of the sensed in-path vehicle. Using the range and range rate, the speed of the ACC equipped vehicle is controlled to maintain a selected following interval between the ACC equipped vehicle and the sensed in-path vehicle. The speed of the ACC equipped vehicle is typically controlled by automatic control of the vehicle throttle actuator. In more advanced ACC methods and systems, vehicle speed may also be controlled by automatic control of vehicle brake actuators. Such ACC methods and systems have the ability to apply a moderate degree of braking to the vehicle to achieve further vehicle deceleration (i.e., in addition to vehicle deceleration achieved via throttle control) in response to an in-path vehicle.

Existing ACC methods and systems, however, do not provide any indication to the operator of the ACC equipped vehicle of a vehicle braking event commanded by such ACC methods and systems. Without such an indication, the vehicle operator may be unaware that the ACC system is automatically braking the vehicle.

Thus, in an ACC system, there exists a need for a method and system for indicating a vehicle braking event to an operator of the vehicle. Such a method and system would determine the occurrence of a vehicle braking event commanded by the adaptive speed control system, and activate a vehicle braking indicator in response to the occurrence of such a vehicle baking event, wherein the vehicle braking indicator is perceptible by the vehicle operator. Such a method and system would provide an indication to the operator of the ACC equipped vehicle of a vehicle braking event commanded by the ACC system. In so doing, such a method and system would provide an increased degree of awareness to the operator of the ACC equipped vehicle that a braking force is being automatically applied to the vehicle.

DISCLOSURE OF INVENTION

Accordingly, it is a principal object of the present invention to provide a method and system for indicating to a vehicle operator the occurrence of a vehicle braking event commanded by an adaptive speed control system.

According to the present invention, then, in an adaptive speed control system for a vehicle, a method is provided for indicating a vehicle braking event to an operator of the vehicle. The method comprises determining the occurrence of a vehicle braking event commanded by the adaptive speed control system, and activating a vehicle braking indicator in response to the occurrence of the vehicle baking event, wherein the vehicle braking indicator is perceptible by the vehicle operator.

Similarly, the present invention also provides, in an adaptive speed control system for a vehicle, a system for indicating a vehicle braking event to an operator of the vehicle. The system comprises a vehicle braking indicator perceptible by the vehicle operator, and a controller capable of determining the occurrence of a vehicle braking event commanded by the adaptive speed control system. The controller is further capable of generating a vehicle braking event signal in response to the occurrence of the vehicle braking event, wherein the vehicle braking event signal is operative to activate the vehicle braking indicator.

These and other objects, features and advantages of the present invention will be readily apparent upon consideration of the following detailed description of the invention in conjunction with the accompanying drawings.

BRIEF DESCRIPTION OF DRAWINGS

FIG. 1 is a simplified block diagram of an adaptive speed control system, including the system of the present invention;

FIG. 2 is a diagram depicting an example of a sensed in-path vehicle in an adaptive speed control system; and FIG. 3 is a flowchart including the method of the present invention.

BEST MODE FOR CARRYING OUT THE INVENTION

Referring to FIGS. 1–3, the preferred embodiment of the method and system of the present invention will now be described. In that regard, FIG. 1 illustrates a simplified block diagram of an Adaptive Cruise Control (ACC) system, including the system of the present invention, denoted generally by reference numeral 10.

In general, as is well known to those of ordinary skill in the art, ACC system (10) is a closed loop control system intended to respond to potential targets in front of and in the same lane of traffic as the vehicle equipped with the ACC system (10). The goal of ACC system (10) is to partially automate the continuous longitudinal control of the vehicle, thereby providing the vehicle operator with improved comfort and convenience. In that regard, ACC system (10) may operate in either a normal or a following mode. In normal mode operation, ACC system (10) controls the speed of the ACC equipped vehicle to the speed set by the vehicle operator as the control speed. In following mode operation, ACC system (10) controls the speed of the ACC equipped vehicle to the speed of a sensed in-path vehicle (which may be referred to as a sensed target or a primary target).

More specifically, as seen in FIG. 1, the ACC system (10) includes a vehicle controller (12) provided in communication with a range sensor (14), a speed sensor (16), a yaw rate sensor (18), a user interface (20), a throttle actuator (22), a brake actuator (24), and a vehicle braking event indicator (26). As previously described, the system (10) extends the function of conventional speed control systems. In that regard, based on range and relative velocity information obtained and/or derived from forward looking range sensor (14) and speed sensor (16), vehicle controller (12) uses throttle and brake actuators (22, 24) to control the speed of the ACC equipped vehicle in order to maintain a selected following interval (in seconds) between the ACC equipped vehicle and a sensed target (i.e., a lead vehicle) in the forward path of travel of the ACC equipped vehicle.

The following interval between the ACC equipped vehicle and the sensed target is initially set at a default value (typically two seconds) upon activation of the system (10), but may be modified by the vehicle operator to a number of other selectable values (typically a value greater than or equal to one second, but less than or equal to two seconds) via user interface (20). The default following interval is typically the maximum following interval allowed, and modification of the following interval by the vehicle operator is permitted between that maximum and a defined minimum following interval. The following interval is referred to as headway, and is defined as the range to the sensed target (in meters), divided by the speed of the ACC equipped vehicle (in meters per second). User interface (20) is also used by the vehicle operator to set the desired vehicle control speed.

As previously noted, ACC systems and methods are well known in the art. As a result, a detailed description of the general operation of ACC system (10), including such functions as acquisition, discrimination, differentiation, selection and tracking of targets, range and relative velocity (range rate) determinations, sensor operations, and throttle and brake control is unnecessary and, for the sake of brevity, is not set forth herein. In connection with the method and system of the present invention, such functions of ACC system (10) may be undertaken in any fashion known to those of ordinary skill.

As also previously noted, existing ACC methods and systems do not provide any indication to the operator of the ACC equipped vehicle of a vehicle braking event commanded by such ACC methods and systems. Without such an indication, the vehicle operator may be unaware that existing ACC methods and systems are automatically braking the vehicle.

In that regard, FIG. 2 depicts an example of a sensed in-path vehicle in a typical ACC method and system. As seen therein, ACC equipped vehicle (30) uses radar pattern (32) of an ACC range sensor (not shown) to identify lead vehicle (34) as a sensed target. If necessary, ACC equipped vehicle (30) automatically decelerates to maintain a selected headway setting. Such deceleration may include automatic application of a braking force to the ACC equipped vehicle (30), as by a control signal generated by vehicle controller (12) of FIG. 1 and sent to bake actuator (24) to activate a vehicle brake (not shown).

The present invention provides, in the ACC system (10) of FIG. 1, a method and system for indicating to the operator of the ACC equipped vehicle a vehicle braking event commanded by ACC system (10). The present invention determines the occurrence of a vehicle braking event commanded by the ACC system, and activates a vehicle braking indicator in response, wherein the vehicle braking indicator is perceptible by the vehicle operator. The present invention thereby provides an indication to the operator of the ACC equipped vehicle of a vehicle braking event commanded by the ACC method and system. In so doing, present invention provides an increased degree of awareness to the operator of the ACC equipped vehicle that a braking force is being automatically applied to the vehicle.

Referring again to FIG. 1, the system of the present invention includes vehicle braking indicator (26), that is positioned in the ACC equipped vehicle such that it is perceptible by the vehicle operator. In that regard, vehicle braking indicator (26) is preferably a visual indicator, but other types of indicators, such as an audible indicator, may be used. Still further in that regard, vehicle braking indicator (26) is preferably a light emitting diode that is located in the rear headliner of the ACC equipped vehicle, and is visible to the vehicle operator through the vehicle rear view mirror. Alternatively, vehicle braking indicator (26) may also be a light located in the center high mounted stop light housing of the ACC equipped vehicle such that it is visible to the vehicle operator in the vehicle rear view mirror. Finally, vehicle braking indicator (26) may also be a light located in a vehicle instrument display panel or instrument cluster, or in a heads-up display. In each of these alternatives, the light used for vehicle braking indicator (26) is preferably red, the conventional color used for indication of vehicle braking.

The system of the present invention also includes a controller. In that regard, the controller of the system of the present invention is preferably embodied in vehicle controller (12). The controller of the present invention is capable of determining the occurrence of a vehicle braking event commanded by ACC system (10) and generating a vehicle braking event signal in response to the occurrence of the vehicle braking event, wherein the vehicle braking event signal is operative to activate the vehicle braking indicator (26). It should be noted here that the controller (as well as vehicle controller (12) of ACC system (10)) may take the form of an appropriately programmed microprocessor, or any equivalent thereof.

More specifically, to determine the occurrence of a vehicle braking event commanded by ACC system (10), the controller of the system of the present invention preferably monitors brake actuator (24) for operation. In that regard, during following mode operation of the ACC system (10) as previously described, ACC system (10) may command a vehicle braking event. That is, ACC system (10) may decrease the speed of the ACC equipped vehicle by automatic activation of brake actuator (24) such that hydraulic pressure is applied to the associated vehicle brake or brake system. Upon detection of the automatic application of a nominal amount of such hydraulic pressure, the controller of the system of the present invention generates a vehicle braking event signal. In turn, the vehicle braking event signal is operative to activate vehicle braking indicator (26). As previously described, vehicle braking indicator (26) is perceptible to the operator of the ACC equipped vehicle, and indicates to the operator that a braking force is being automatically applied to the vehicle by ACC system (10). Operation of the braking indicator (26) in this fashion is similar to the well known operation of the brake lights of a vehicle. In that regard, braking indicator (26) is preferably activated immediately upon the application of a nominal amount of hydraulic brake pressure, and remains activated as long as the hydraulic brake pressure is equal to or greater than that nominal value. In such a fashion, the vehicle operator is made aware of a vehicle braking event commanded by ACC system (10) immediately upon the commencement and during the entire vehicle braking event.

Alternatively, to determine the occurrence of a vehicle braking event commanded by ACC system (10), the controller of the system of the present invention may also be capable of monitoring the ACC system (10) itself for the generation of a control signal for controlling brake actuator (24). Once again, during following mode operation of the ACC system (10) as previously described, ACC system (10) may command a vehicle braking event. In so doing, ACC system (10) generates a control signal that is operative to automatically activate brake actuator (24) in order to decrease the speed of the ACC equipped vehicle. In this embodiment, upon detection of the generation of such a control signal, the controller of the system of the present invention generates a vehicle braking event signal. In turn, the vehicle braking event signal is once again operative to activate vehicle braking indicator (26). Vehicle braking indicator (26), as previously described, is perceptible to the operator of the ACC equipped vehicle, and indicates to the operator that a braking force is being automatically applied to the vehicle by ACC system (10). In this embodiment, the control signal for controlling brake actuator (24) may itself also be used as the vehicle braking event signal. Once again, in this embodiment, braking indicator (26) is preferably activated immediately upon generation by ACC system (10) of the control signal for controlling brake actuator (24), and remains active as long as the vehicle braking event persists. That is, the vehicle operator is preferably made aware of a vehicle braking event commanded by ACC system (10) immediately upon the commencement and during the entire vehicle braking event.

Referring now to FIG. 3, a flowchart including the method of the present invention is shown, depicted generally by reference numeral 40. As seen therein, during operation, existing ACC methods include a headway maintenance algorithm which operates based on existing target information (42), including the range and range rate of the primary target and a selected headway value. Such an algorithm, once again, is well known to those of ordinary skill in the art.

According to the method of the present invention, during and as part of such operation, it is determined whether a vehicle braking event has been automatically commanded (44) in the ACC equipped vehicle. If not, operation of the headway maintenance algorithm continues based on existing target information (42). If, however, such a vehicle braking event is occurring, then a vehicle braking indicator that is perceptible by the vehicle operator is activated in response (46). As discussed above in connection with the system of the present invention, according to the method of the present invention, determining the occurrence of a commanded vehicle braking event (44) may comprise monitoring a brake actuator for automatic operation, or monitoring the ACC system itself for the generation of a brake actuation control signal. Similarly, as also discussed above in connection with the system of the present invention, activating a vehicle brake indicator (46) according to the method of the present invention may comprises activating a visual indicator, such as a light emitting diode located in a vehicle headliner, a light located in the center high mounted stop light housing that is visible to the vehicle operator in the rear view mirror, a light located in a vehicle instrument display panel or instrument cluster, or a heads-up display.

In view of the foregoing description, it can be seen that the present invention provides, in an ACC system for a vehicle, a method and system for indicating to the operator of the ACC equipped vehicle the occurrence of a vehicle braking event commended by the ACC systems. The present invention determines the occurrence of such a commanded vehicle braking event, and activates a vehicle braking indicator in response, wherein the vehicle braking indicator is perceptible by the vehicle operator. The present invention thereby provides an indication to the operator of the ACC equipped vehicle of a vehicle braking event commanded by the ACC system. In so doing, present invention provides an increased degree of awareness to the operator of the ACC equipped vehicle that a braking force is being automatically applied to the vehicle.

While various embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In an adaptive speed control system for a vehicle, a method for indicating a vehicle braking event to an operator of the vehicle, the method comprising:

determining the occurrence of a vehicle braking event commanded by the adaptive speed control system, the vehicle braking event having a duration commencing when the adaptive speed control system first commands vehicle braking; and activating a vehicle braking indicator in response to the occurrence of the vehicle baking event, wherein the vehicle braking indicator is perceptible by the vehicle operator and remains activated for the duration of the vehicle braking event.

2. The method of claim 1 wherein determining the occurrence of a vehicle braking event includes monitoring a brake actuator for operation.

3. The method of claim 1 wherein determining the occurrence of a vehicle braking event includes monitoring the adaptive cruise control system for the generation of a brake actuator control signal.

4. The method of claim 1 wherein activating a vehicle brake indicator comprises activating a visual indicator, the visual indicator indicating to the vehicle operator the occurrence of the vehicle braking event commanded by the adaptive speed control system.

5. The method of claim 4 wherein activating a visual indicator comprises activating a light emitting diode located in a vehicle headliner.

6. The method of claim 4 wherein activating a visual indicator comprises a activating a light located in a center high mounted stop light housing that is visible to the vehicle operator in a rearview mirror.

7. The method of claim 4 wherein activating the visual indicator comprises activating a light located in a vehicle instrument display.

8. The method of claim 4 wherein activating the visual indicator comprises activating a heads-up display.

9. In an adaptive speed control system for a vehicle, a system for indicating a vehicle braking event to an operator of the vehicle, the system comprising:

a vehicle braking indicator perceptible by the vehicle operator; and a controller capable of determining the occurrence of a vehicle braking event commanded by the adaptive speed control system, the vehicle braking event having a duration commencing when the adaptive speed control system first commands vehicle braking, and generating a vehicle braking event signal in response to the occurrence of the vehicle braking event, wherein the vehicle braking event signal is operative to activate the vehicle braking indicator for the duration of the vehicle braking event.

10. The system of claim 9 wherein, to determine the occurrence of a vehicle braking event, the controller is capable of monitoring a brake actuator for operation.

11. The system of claim 9 wherein, to determine the occurrence of a vehicle braking event, the controller is capable of monitoring the adaptive cruise control system for the generation of a brake actuator control signal.

12. The system of claim 9 wherein the vehicle braking indicator comprises a visual indicator, the visual indicator indicating to the vehicle operator the occurrence of the vehicle braking event commanded by the adaptive speed control system.

13. The system of claim 12 wherein the visual indicator comprises a light emitting diode located in a vehicle headliner.

14. The system of claim 12 wherein the visual indicator comprises a light located in a center high mounted stop light housing that is visible to the vehicle operator in a rearview mirror.

15. The system of claim 12 wherein the visual indicator comprises a light located in a vehicle instrument display.

16. The system of claim 12 wherein the visual indicator comprises a heads-up display.

* * * * *